United States Patent
Ding et al.

(10) Patent No.: US 11,611,102 B2
(45) Date of Patent: Mar. 21, 2023

(54) HIGH-EFFICIENCY WORKING METHOD FOR BATTERY ENERGY STORAGE SYSTEM AT LOW TEMPERATURE

(71) Applicant: SOUTHEAST UNIVERSITY, Jiangsu (CN)

(72) Inventors: Haohui Ding, Jiangsu (CN); Qinran Hu, Jiangsu (CN); Xiangjun Quan, Jiangsu (CN); Xiaobo Dou, Jiangsu (CN); Zaijun Wu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/770,529

(22) PCT Filed: Dec. 7, 2021

(86) PCT No.: PCT/CN2021/136182
§ 371 (c)(1),
(2) Date: Apr. 20, 2022

(87) PCT Pub. No.: WO2022/227580
PCT Pub. Date: Nov. 3, 2022

(65) Prior Publication Data
US 2022/0399566 A1     Dec. 15, 2022

(30) Foreign Application Priority Data
Apr. 28, 2021 (CN) .......................... 202110463244.3

(51) Int. Cl.
*H01M 10/0525* (2010.01)
*H01M 4/58* (2010.01)
*H02J 7/00* (2006.01)

(52) U.S. Cl.
CPC ..... *H01M 10/0525* (2013.01); *H01M 4/5825* (2013.01); *H02J 7/0014* (2013.01)

(58) Field of Classification Search
CPC ................................................ H01M 10/0525
(Continued)

(56) References Cited

U.S. PATENT DOCUMENTS

| 11,545,662 B2 * | 1/2023 | Endo .................... H01M 4/0471 |
| 11,545,697 B2 * | 1/2023 | Morinaka ......... H01M 10/0569 |

(Continued)

FOREIGN PATENT DOCUMENTS

| CN | 103812165 A | 5/2014 |
| CN | 205543078 U | 8/2016 |

(Continued)

OTHER PUBLICATIONS

Rui et al., "Optimization of LiFePO$_4$-AC/Li$_4$Ti$_5$O$_{12}$ Hybrid Cells," Rare Metal Materials and Engineering, vol. 38, Suppl. 2, Dec. 2009, 4 pages (w/English-lanaguage abstract on p. 4).

*Primary Examiner* — Yalkew Fantu
(74) *Attorney, Agent, or Firm* — Muncy, Geissler, Olds & Lowe, P.C.

(57) ABSTRACT

The present invention discloses a high-efficiency working method for a battery energy storage system at low temperature. In the present invention, combined operation of two kinds of batteries is taken as an example to build an energy storage system framework at low temperature. A lithium iron phosphate battery and a lithium titanate battery are selected for combined operation to achieve complementary advantages of the two kinds of batteries; then, an energy storage system model for combined operation of the two kinds of batteries with the consideration of an impact of temperature on charging/discharging efficiency of the batteries is built; and finally, an optimal dispatching solution for a battery energy storage system composed of the lithium titanate battery and the lithium iron phosphate battery at low temperature is provided. By the above steps, the present invention achieves high-efficiency outputting of electricity (Continued)

of the battery energy storage system at low temperature, achieves complementary advantage of different kinds of batteries, and also ensures low overall cost.

4 Claims, 3 Drawing Sheets

(58) Field of Classification Search
USPC .......................................................... 320/116
See application file for complete search history.

(56) References Cited

U.S. PATENT DOCUMENTS

| | | | |
|---|---|---|---|
| 2015/0077057 A1* | 3/2015 | Kelty | ................ H02J 7/007194 |
| | | | 320/109 |
| 2016/0268841 A1* | 9/2016 | Zeier | ......................... H02J 7/02 |

FOREIGN PATENT DOCUMENTS

| | | | |
|---|---|---|---|
| CN | 206098546 U | | 4/2017 |
| CN | 107039708 A | | 8/2017 |
| CN | 107947294 A | | 4/2018 |
| CN | 109687559 A | | 4/2019 |
| CN | 111159916 | * | 5/2020 |
| CN | 111159916 A | | 5/2020 |
| CN | 211844152 U | | 11/2020 |
| CN | 112086982 A | | 12/2020 |
| CN | 112883596 A | | 6/2021 |
| WO | WO-2013/125155 A1 | | 8/2013 |

\* cited by examiner

HIGH-EFFICIENCY WORKING METHOD FOR BATTERY ENERGY STORAGE SYSTEM AT LOW TEMPERATURE

TECHNICAL FIELD

The present invention belongs to the technical field of power systems, and in particular relates to a battery energy storage system at low temperature.

BACKGROUND

Nowadays, there are about 80 million people living in cold areas with winter temperatures below −30° C. As the proportion of renewable energy continues to increase, in order to ensure stable power supplying, more and more battery energy storage systems are needed. However, battery energy storage system is mostly composed of lithium iron phosphate batteries, which have poor performance at low temperature. At −20° C., the discharging efficiency of the lithium iron phosphate battery is only about 30% of that at room temperature, and it is almost impossible to be charged.

If a lithium titanate battery is used to replace the lithium iron phosphate battery to form the battery energy storage system, although the charging/discharging efficiency is high at low temperature, the cost is high and the energy density is low, which greatly limits its large-scale application.

On the whole, the lithium iron phosphate battery has poor low-temperature starting capability, low charging/discharging efficiency at low temperature, but high energy density and is cheap. Lithium titanate has good low-temperature starting capability, high charging/discharging efficiency at low temperature, but low energy density and is expensive. Therefore, the current energy storage system with a single type of battery has significant deficiencies at low temperature.

SUMMARY

To solve this problem, the present invention provides a high-efficiency working method for a battery energy storage system at low temperature. Through joint operation of lithium titanate battery with high charging/discharging efficiency at low temperature but being expensive, and lithium iron phosphate battery with high energy density and being cheap but has low charging/discharging efficiency at low temperature, the complementary advantages of the two kinds of batteries are realized. Hence, high-efficiency work of the battery energy storage system at low temperature is achieved.

To resolve the foregoing technical problem, the following technical solutions are used in the present invention:

The present invention provides a high-efficiency working method for a battery energy storage system at low temperature. A battery energy storage system framework composed of various kinds of batteries is built; models of lithium iron phosphate battery and lithium titanate battery are built, which considering the effect of low temperature on the battery charging/discharging efficiency; a battery energy storage system optimization model is built on the basis of advantage complementation of all the kinds of batteries; the optimization model is solved using a solver to obtain an optimal dispatching solution for the battery energy storage system composed of the various kinds of batteries at low temperature.

Further, according to the high-efficiency working method for a battery energy storage system at low temperature provided by the present invention, the energy storage system is composed of a lithium titanate battery, a lithium iron phosphate battery, and heating equipment; the lithium titanate battery is firstly used for charging the heating equipment to increase a temperature in an energy storage house; when the temperature reaches a certain range, the lithium iron phosphate battery then executes charging and discharging work; and the optimization model is built as shown below:

$$\max \sum p_{SUP}^{ES1}(t) + \sum p_{SUP}^{ES2}(t), \text{ S.t. } \begin{cases} \text{electric balance:}(a1)-(a10) \\ \text{heat balance:}(a11)-(a14) \end{cases}$$

where an electric balance model of an electric system is as shown in (a1) to (a10) below:

$$p_{con}^{ES1}(t) \cdot \eta^{ES1}(T_t) = p_{all}^{ES1}(t) \tag{a1}$$

$$p_{all}^{ES1}(t) = p_{SUP}^{ES1}(t) + p_{AC}^{ES1}(t) \tag{a2}$$

$$p_{con}^{ES2}(t) \cdot \eta^{ES2}(T_t) = p_{all}^{ES2}(t) \tag{a3}$$

$$p_{all}^{ES2}(t) = p_{SUP}^{ES2}(t) + p_{AC}^{ES2}(t) \tag{a4}$$

In the formulas, $p_{con}^{ES1}$ electric energy consumed inside the lithium iron phosphate battery; $\eta^{ES1}(T_t)$ is output efficiency of the lithium iron phosphate battery; $p_{all}^{ES1}(t)$ is total electric energy output by the lithium iron phosphate battery; $p_{SUP}^{ES1}$ is power output by the lithium iron phosphate battery to the outside; $p_{AC}^{ES1}$ is power transmitted by the lithium iron phosphate battery to the heating equipment; $p_{con}^{ES2}$ is electric energy consumed inside the lithium titanate battery; $\eta^{ES2}(T_t)$ is output efficiency of the lithium titanate battery; $p_{all}^{ES2}(t)$ is total electric energy output by the lithium titanate battery; $p_{SUP}^{ES2}$ is power output by the lithium titanate battery to the outside; $p_{AC}^{ES2}$ is power transmitted by the lithium titanate battery to the heating equipment.

Efficiency of battery packs in formulas (a1) and (a2) is affected by temperature, as shown in formulas (a5)-(a6):

$$\eta^{ES1}(T_t^{in}) = k_1^{\eta} \cdot T^{in}(t) + C_1^{\eta} \tag{a5}$$

$$\eta^{ES2}(T_t^{in}) = k_2^{\eta} \cdot T^{in}(t) + C_2^{\eta} \tag{a6}$$

where $T^{in}$ is temperature in the energy storage house, and $k_1^{\eta}, k_2^{\eta}, C_1^{\eta}, C_2^{\eta}$ are fit coefficients.

In addition, total electric energy consumed by the two groups of batteries should not exceed maximum electric energies $ES_{max}^{ES1}$ and $ES_{max}^{ES2}$ stored in the batteries; and power output by the two groups of batteries should not exceed maximum power $ESP_{max}^{ES1}$ and $ESP_{max}^{ES2}$ of the batteries; that is:

$$\Sigma p_{con}^{ES1} \leq ES_{max}^{ES1} \tag{a7}$$

$$\Sigma p_{con}^{ES2} \leq ES_{max}^{ES2} \tag{a8}$$

$$p_{con}^{ES1} \leq ESP_{max}^{ES1} \tag{a9}$$

$$p_{con}^{ES2} \leq ESP_{max}^{ES2} \tag{a10}$$

A heat balance model is as shown in (a11) to (a14) below:

$$C \cdot \left(T^{in}(t+1) - T^{in}(t)\right) = \left(\frac{T^{out} - T^{in}(t)}{R} + Q^{ES1}(t) + Q^{ES2}(t) + Q^{AC}(t)\right) \tag{a11}$$

Formula (a11) represents that a sum of heat added in the house is equal to multiplying a thermal capacitance C with a variation of the temperature in the house; $Q^{ES1}$ represents heat emitted by the lithium iron phosphate battery; $Q^{ES2}$ represents heat emitted by the lithium titanate battery; $Q^{AC}$ represents heat emitted by a heating equipment; $T^{out}$ is a temperature outside the house; $T^{in}$ is the temperature inside the house; and R is the thermal resistance.

Heat output by the two batteries and the temperature in the house are linearly correlated, and a relationship between the heat output by the battery and the temperature is as follows:

$$Q^{ES1}(t)=k_1^Q \cdot T^{in}(t)+C_1^Q \qquad (a12)$$

$$Q^{ES2}(t)=k_2^Q \cdot T^{in}(t)+C_2^Q \qquad (a13)$$

The heat $Q^{AC}$ emitted by the heating equipment is in direct proportion to a product of voltage and current of the heating equipment, that is, is in direct proportion to electric energy consumed by the heating equipment $L^{AC}$ $$Q^{AC}(t)=k_3^Q L^{AC}(t) \qquad (a14)$$

In the formulas, $k_1^Q$, $k_2^Q$, $k_3^Q$, $C_1^Q$, $C_2^Q$ are fit coefficients.

Further, according to the high-efficiency working method for a battery energy storage system at low temperature provided by the present invention, the battery adopts a pulse discharging method, so that the temperature of batteries can be increased.

Besides, according to the high-efficiency working method for a battery energy storage system at low temperature provided by the present invention, when a discharging process is going to end, supplying of power to the heating equipment is stopped, so that the total electricity to the outside will increase.

In addition, according to the high-efficiency working method for a battery energy storage system at low temperature provided by the present invention, in the discharging process, by adjusting the power consumed by the heating equipment and the output power of the batteries, in case of considering heating power consumption, the temperature in the energy storage house is controlled in a degree that is most suitable for the work of the batteries, so that the output efficiency of the batteries is the highest.

Compared with the existing technology, the present invention adopting the above technical solution has the following advancements:

The present invention achieves complementary advantages of various kinds of batteries through combined operation of the various kinds of batteries, and solves the problem that battery energy storage systems with a single battery type has low charging/discharging efficiency at low temperature, or is expensive and has low energy density, and achieves high-efficiency work of the battery energy storage system at low temperature.

At the same time, in the present invention, the combined operation of two kinds of batteries is taken as an example to build the energy storage system framework, and the lithium iron phosphate battery and the lithium titanate battery are selected for combined operation. In the combined operation, the present invention exerts the advantage of high charging/discharging efficiency of the lithium titanate battery at low temperature and the advantages of low cost and high energy density of the lithium iron phosphate.

By adopting the method of the present invention, the cost of output electricity per kWh at low temperature and the needed weight of the battery energy storage system are significantly less than those of the current energy storage system with a single battery type, so the present invention has crucial significance.

DETAILED DESCRIPTION

The following further describes the present invention in detail with reference to the accompanying drawings. The following embodiments are only used to describe the technical solutions of the present invention more clearly, and cannot be used to limit the protection scope of the present invention.

Figure 1:
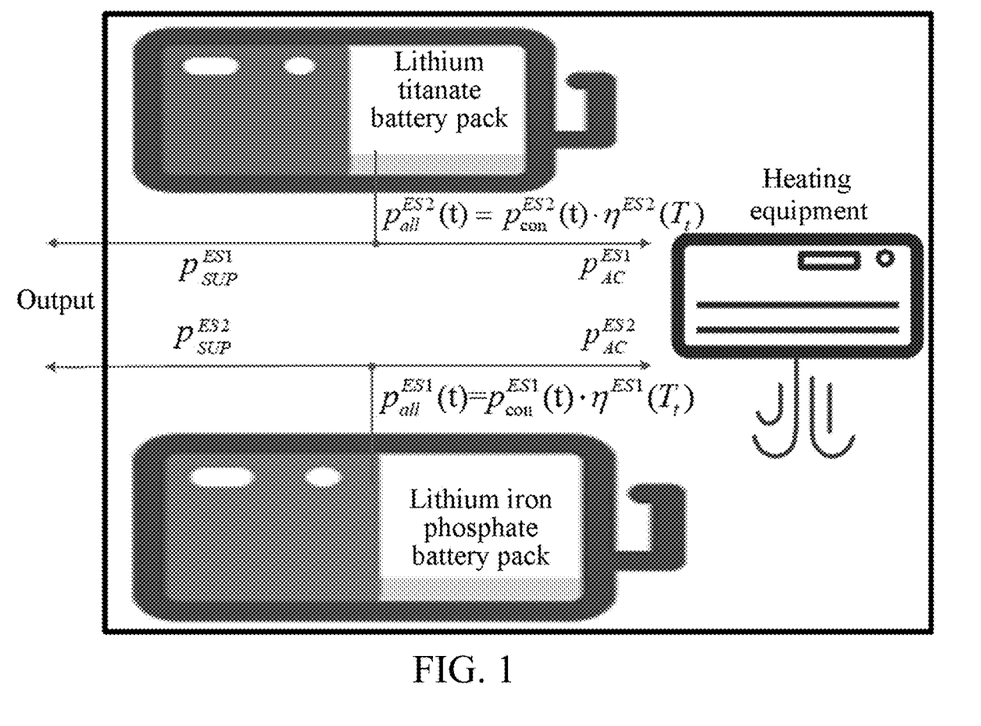
FIG. 1 is a schematic diagram of an energy storage shelter electric system.
Figure 2:
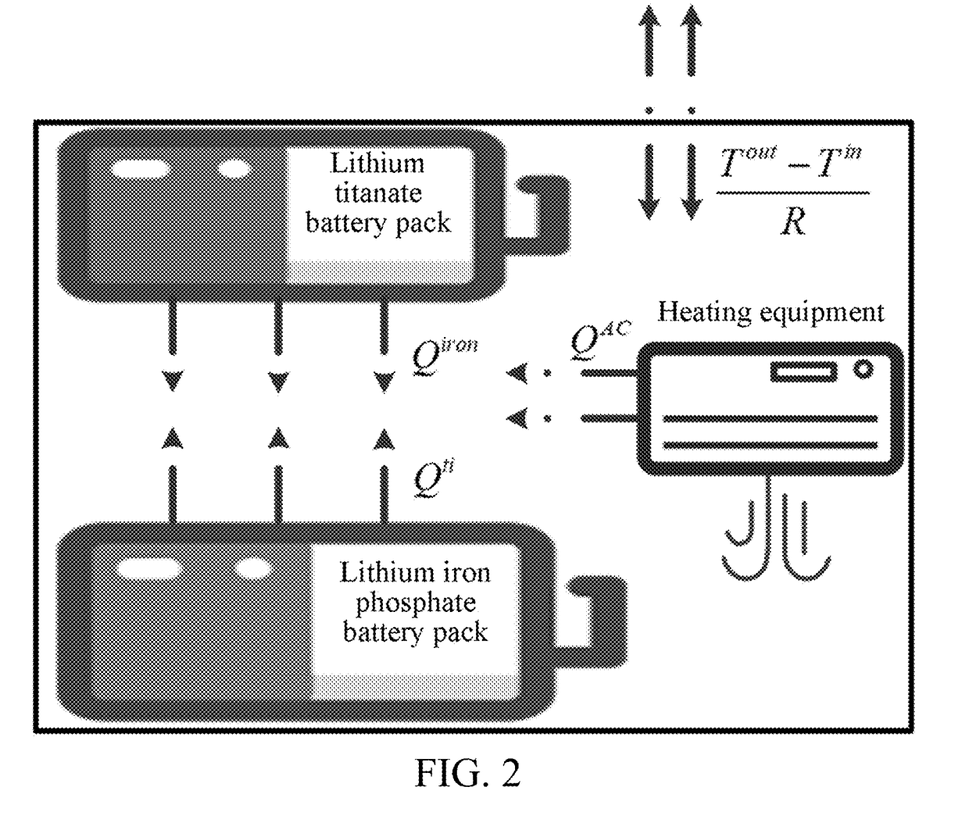
FIG. 2 is a schematic diagram of an energy storage shelter thermal system.

A schematic diagram of an electric system of a battery energy storage system designed in the present invention is shown in FIG. 1, and a thermal system of the battery energy storage system is shown in FIG. 2. The following specific contents are included;

As shown in FIG. 1, after two batteries output electric energy to the outside at certain efficiency, a part of the electric energy is supplied to an external load, and a part of the electric energy is supplied to heating equipment. After the heating equipment is electrified, the temperature of batteries will increase, thus improving the output efficiency of the batteries.

As shown in FIG. 2, there are three heat sources in the battery energy storage system. 1. The heating equipment releases heat. 2. The lithium iron phosphate battery will generate heat during work. 3. The lithium titanate battery will generate heat during work. In addition, an energy storage house has been exchanging heat with the outside all the time. By controlling the heat emitted by the three heat sources, the battery energy storage system can be maintained at a suitable temperature, so that the batteries can achieve high-efficiency outputting.

Figure 3:
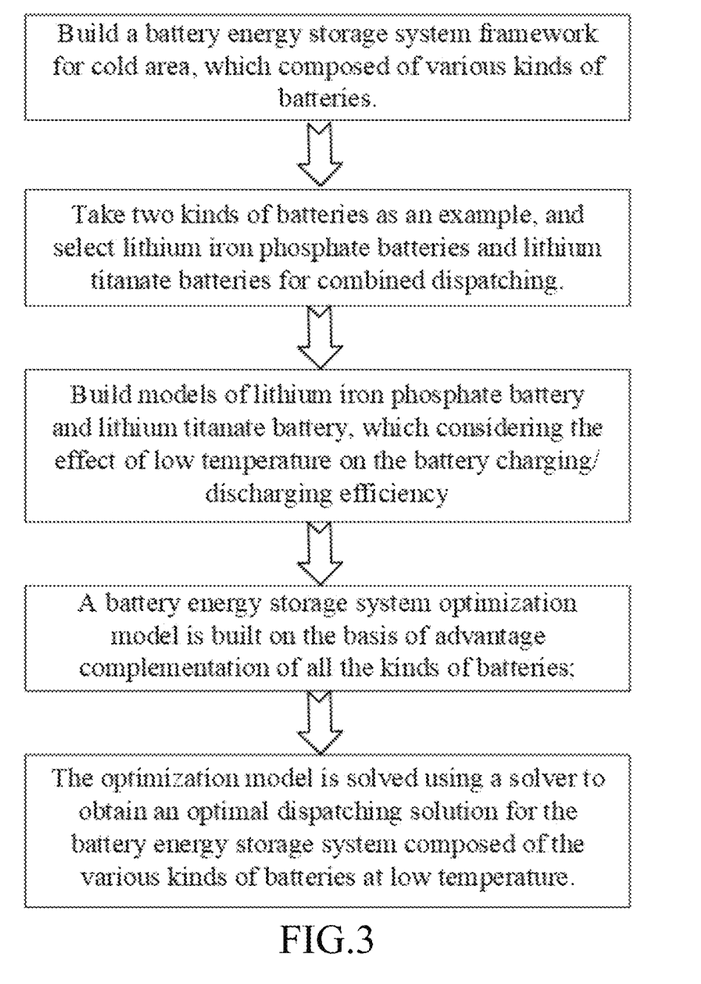
FIG. 3 is a flow chart of a method of the present invention.

With reference to FIG. 3, a specific embodiment of the high-efficiency working method of a battery energy storage system at low temperature of the present invention is described in detail below.

In the present invention, a variety of kinds of batteries are subjected to combined operation to complement to each other in advantages, thus achieving the high-efficiency work of the battery energy storage system at low temperature. The lithium titanate battery has good low temperature performance, but is expensive and has low energy density. The lithium iron phosphate battery has poor low temperature performance, but is relatively cheap and has high energy density. The two kinds of batteries are combined; a small number of lithium titanate batteries are used for charging the heating equipment firstly to increase the temperature in the energy storage house, thereby improving the charging and discharging efficiency of the lithium iron phosphate batteries. A large number of lithium iron phosphate batteries are then used for performing charging and discharging work. Since fewer lithium titanate batteries and more lithium iron phosphate batteries are used, after the two kinds of batteries are combined, the price is lower and the energy density is higher. In addition, the low-temperature performance is excellent as well.

A modeling method of an energy storage shelter electric system is:

$$p_{con}^{ES1}(t) \cdot \eta^{ES1}(T_t) = p_{all}^{ES1}(t) \qquad (a1)$$

In the formula, $p_{con}^{ES1}$ is electric energy consumed inside the lithium iron phosphate battery; $\eta^{ES1}(T_t)$ is output efficiency of the lithium iron phosphate battery; and $p_{all}^{ES1}(t)$ is total electric energy output by the lithium iron phosphate battery.

$$p_{all}^{ES1}(t)=p_{SUP}^{ES1}(t)+p_{AC}^{ES1}(t) \quad (a2)$$

In the formula, $p_{SUP}^{ES1}$ is power output by the lithium iron phosphate battery to the outside; and $p_{AC}^{ES1}$ is power transmitted by the lithium iron phosphate battery to the heating equipment.

$$p_{con}^{ES2}(t)\cdot\eta^{ES2}(T_t)=p_{all}^{ES2}(t) \quad (a3)$$

In the formula, $p_{con}^{ES2}$ is electric energy consumed inside the lithium titanate battery; $\eta^{ES2}(T_t)$ is output efficiency of the lithium titanate battery; and $p_{all}^{ES2}(t)$ is total electric energy output by the lithium titanate battery.

$$p_{all}^{ES2}(t)=p_{SUP}^{ES2}(t)+p_{AC}^{ES2}(t) \quad (a4)$$

In the formula, $p_{SUP}^{ES2}$ is power output by the lithium titanate battery to the outside; and $p_{AC}^{ES2}$ is power transmitted by the lithium titanate battery to the heating equipment.

Efficiency of battery packs in formulas (a1) and (a2) is affected by temperature. In the present invention, actually measured data is fitted, and results are as shown in formulas (a5)-(a6).

$$\eta^{ES1}(T_t^{in})=k_1^{\eta}\cdot T^{in}(t)+C_1^{\eta} \quad (a5)$$

$$\eta^{ES2}(T_t^{in})=k_2^{\eta}\cdot T^{in}(t)+C_2^{\eta} \quad (a6)$$

In the formulas, $T^{in}$ is temperature in the energy storage house, and $k_1^{\eta}$, $k_2^{\eta}$, $C_1^{\eta}$, $C_2^{\eta}$ are fit coefficients. In addition, total electric energy consumed by the two groups of batteries should not exceed maximum electric energies $ES_{max}^{ES1}$ and $ES_{max}^{ES2}$ stored in the batteries. Power emitted by the two groups of batteries should not exceed maximum power $ESP_{max}^{ES1}$ and $ESP_{max}^{ES2}$ of the batteries.

$$\Sigma p_{con}^{ES1} \leq ES_{max}^{ES1} \quad (a7)$$

$$\Sigma p_{con}^{ES2} \leq ES_{max}^{ES2} \quad (a8)$$

$$p_{con}^{ES1} \leq ESP_{max}^{ES1} \quad (a9)$$

$$p_{con}^{ES2} \leq ESP_{max}^{ES2} \quad (a10)$$

A thermal model of the present invention is as shown below.

The heat balance of the energy storage house is similar to that of a building. Therefore, the present invention uses a heat balance model similar to that of a building.

There are three heat sources inside the energy storage house, which are heat $Q^{ES1}$ from the lithium iron phosphate battery, heat $Q^{ES2}$ from the lithium titanate battery, and heat $Q^{AC}$ from a heating equipment. At the same time, the energy storage house has been exchanging heat with the outside all the time, and a numerical value is obtained by dividing a difference between the temperature outside the house $T^{out}$, and the temperature inside the house $T^{in}$ by a thermal resistance R. As shown in formula a(11), a sum of heat in the house is equal to multiplying a thermal capacitance C with a variation of the temperature in the house.

$$C\cdot(T^{in}(t+1)-T^{in}(t))=\left(\frac{T^{out}-T^{in}(t)}{R}+Q^{ES1}(t)+Q^{ES2}(t)+Q^{AC}(t)\right) \quad (a11)$$

In formula (a11), $Q^{ES1}$ and $Q^{ES2}$ are related to a current and internal resistance of a battery. In the present invention, the current output by the battery changes little, so that it is set as a constant to avoid nonconvex. The internal resistance of the battery is related to the temperature, so, as shown in formulas (a12) and (a13), the heat emitted by the two batteries is linearly related to the temperature in the house. The present invention obtains a relationship between the heat released by the battery and the temperature based on artificial intelligence and measured data.

$$Q^{ES1}(t)=k_1^Q\cdot T^{in}(t)+C_1^Q \quad (a12)$$

$$Q^{ES2}(t)=k_2^Q\cdot T^{in}(t)+C_2^Q \quad (a13)$$

The heat $Q^{AC}$ emitted by the heating equipment is in direct proportion to a product of voltage and current of the heating equipment, that is, is in direct proportion to electric energy $L^{AC}$ consumed by the heating equipment.

$$Q^{AC}(t)=k_3^Q L^{AC}(t) \quad (a14)$$

In the formulas, $k_1^Q$, $k_2^Q$, $k_3^Q$, $C_1^Q$, $C_2^Q$ are fit coefficients.

In the present invention, an optimization model is built below by taking the maximum total electric energy output by the two kinds of batteries as a target function:

$$\max \sum p_{SUP}^{ES1}(t)+\sum p_{SUP}^{ES2}(t) \quad (a15)$$

$$\text{S.t.} \begin{cases} \text{electric balance:}(a1)-(a10) \\ \text{heat balance:}(a11)-(a14) \end{cases} \quad (a16)$$

The present invention uses a solver to solve the above optimization model, and obtains an optimal dispatch for energy storage of the two kinds of batteries. When the outside temperature is −30° C., the thermal resistance of the energy storage house is 23° C./kW, the thermal capacitance is 20 kJ/° C.; the capacity of the lithium iron phosphate battery is 248 kWh; and when the capacity of the lithium titanate battery is 122 kWh the optimal dispatch aiming to output the maximum power within 1 h is as follows.

The power supplied to the heating equipment per minute by the lithium iron phosphate battery is as shown in Table a1:

TABLE a1

| | \multicolumn{10}{c}{Power supplied to the heating equipment by the lithium iron phosphate battery} |
|---|---|---|---|---|---|---|---|---|---|---|
| | 1st minute | 2nd minute | 3rd minute | 4th minute | 5th minute | 6th minute | 7th minute | 8th minute | 9th minute | 10th minute |
| Power (kW) | 5 | 5 | 0 | 0 | 2.14 | 2.04 | 2.04 | 0 | 2.04 | 0 |

TABLE a1-continued

Power supplied to the heating equipment by the lithium iron phosphate battery

| | 11th minute | 12th minute | 13th minute | 14th minute | 15th minute | 16th minute | 17th minute | 18th minute | 19th minute | 20th minute |
|---|---|---|---|---|---|---|---|---|---|---|
| Power (kW) | 2.04 | 0 | 2.04 | 2.04 | 0 | 0 | 2.04 | 0 | 0 | 2.04 |

| | 21th minute | 22th minute | 23th minute | 24th minute | 25th minute | 26th minute | 27th minute | 28th minute | 29th minute | 30th minute |
|---|---|---|---|---|---|---|---|---|---|---|
| Power (kW) | 0 | 0 | 0 | 0 | 2.04 | 0 | 0 | 0 | 2.04 | 2.04 |

| | 31th minute | 32th minute | 33th. minute | 34th minute | 35th minute | 36th minute | 37th minute | 38th minute | 39th minute | 40th minute |
|---|---|---|---|---|---|---|---|---|---|---|
| Power (kW) | 0 | 2.04 | 2.04 | 2.04 | 2.04 | 2.04 | 0 | 2.04 | 0 | 0 |

| | 41th minute | 42th minute | 43th minute | 44th minute | 45th minute | 46th minute | 47th minute | 48th minute | 49th minute | 50th minute |
|---|---|---|---|---|---|---|---|---|---|---|
| Power (kW) | 2.04 | 2.04 | 0 | 2.04 | 0 | 0 | 2.04 | 0 | 2.04 | 2.04 |

| | 51th minute | 52th minute | 53th minute | 54th minute | 55th minute | 56th minute | 57th minute | 58th minute | 59th minute | 60th minute |
|---|---|---|---|---|---|---|---|---|---|---|
| Power (kW) | 2.04 | 0 | 2.04 | 0 | 0 | 2.04 | 0 | 2.04 | 2.04 | 0 |

The electric energy output by the lithium iron phosphate battery per minute to the outside is as shown in Table a2:

TABLE a2

Power output by the lithium iron phosphate battery to the outside

| | 1st minute | 2nd minute | 3rd minute | 4th minute | 5th minute | 6th minute | 7th minute | 8th minute | 9th minute | 10th minute |
|---|---|---|---|---|---|---|---|---|---|---|
| Power (kW) | 36.4 | 78.5 | 139.5 | 170.4 | 215.8 | 217.5 | 217.5 | 219.6 | 217.5 | 219.6 |

| | 11th minute | 12th minute | 13th minute | 14th minute | 15th minute | 16th minute | 17th minute | 18th minute | 19th minute | 20th minute |
|---|---|---|---|---|---|---|---|---|---|---|
| Power (kW) | 217.5 | 219.6 | 217.5 | 219.6 | 219.6 | 217.5 | 219.6 | 219.6 | 217.5 | 219.6 |

| | 21th minute | 22th minute | 23th minute | 24th minute | 25th minute | 26th minute | 27th minute | 28th minute | 29th minute | 30th minute |
|---|---|---|---|---|---|---|---|---|---|---|
| Power (kW) | 219.6 | 219.6 | 219.6 | 219.6 | 217.5 | 219.6 | 219.6 | 2196 | 217.5 | 217.5 |

| | 31th minute | 32th minute | 33th minute | 34th minute | 35th minute | 36th minute | 37th minute | 38th minute | 39th minute | 40th minute |
|---|---|---|---|---|---|---|---|---|---|---|
| Power (kW) | 219.6 | 217.5 | 217.5 | 217.5 | 217.5 | 217.5 | 219.6 | 217.5 | 219.6 | 219.6 |

| | 41th minute | 42th minute | 43th minute | 44th minute | 45th minute | 46th minute | 47th minute | 48th minute | 49th minute | 50th minute |
|---|---|---|---|---|---|---|---|---|---|---|
| Power (kW) | 217.5 | 217.5 | 219.6 | 217.5 | 219.6 | 219.6 | 217.5 | 219.6 | 217.5 | 217.5 |

| | 51th minute | 52th minute | 53th minute | 54th minute | 55th minute | 56th minute | 57th minute | 58th minute | 59th minute | 60th minute |
|---|---|---|---|---|---|---|---|---|---|---|
| Power (kW) | 217.5 | 219.6 | 217.5 | 219.6 | 219.6 | 217.5 | 219.6 | 217.5 | 217.5 | 219.6 |

The electric energy supplied to the heating equipment per minute by the lithium titanate battery is as shown in Table a3:

TABLE a3

| | \multicolumn{10}{c}{Power supplied to the heating equipment by the lithium titanate battery} |
|---|---|---|---|---|---|---|---|---|---|---|
| | 1st minute | 2nd minute | 3rd minute | 4th minute | 5th minute | 6th minute | 7th minute | 8th minute | 9th minute | 10th minute |
| Power (kW) | 0 | 0 | 5 | 5 | 0 | 0 | 0 | 2.04 | 0 | 2.04 |
| | 11th minute | 12th minute | 13th minute | 14th minute | 15th minute | 16th minute | 17th minute | 18th minute | 19th minute | 20th minute |
| Power (kW) | 0 | 2.04 | 0 | 0 | 2.04 | 2.04 | 0 | 2.04 | 2.04 | 0 |
| | 21th minute | 22th minute | 23th minute | 24th minute | 25th minute | 26th minute | 27th minute | 28th minute | 29th minute | 30th minute |
| Power (kW) | 2.04 | 2.04 | 2.04 | 2.04 | 0 | 2.04 | 2.04 | 2.04 | 0 | 0 |
| | 31th minute | 32th minute | 33th minute | 34th minute | 35th minute | 36th minute | 37th minute | 38th minute | 39th minute | 40th minute |
| Power (kW) | 2.04 | 0 | 0 | 0 | 0 | 0 | 2.04 | 0 | 2.04 | 2.04 |
| | 41th minute | 42th minute | 43th minute | 44th minute | 45th minute | 46th minute | 47th minute | 48th minute | 49th minute | 50th minute |
| Power (kW) | 0 | 0 | 2.04 | 0 | 2.04 | 2.04 | 0 | 2.04 | 0 | 0 |
| | 51th minute | 52th minute | 53th minute | 54th minute | 55th minute | 56th minute | 57th minute | 58th minute | 59th minute | 60th minute |
| Power (kW) | 0 | 2.04 | 0 | 2.04 | 2.04 | 0 | 2.04 | 0 | 0 | 0 |

The electric energy output by the lithium titanate battery per minute to the outside is as shown in Table a4:

TABLE a4

| | \multicolumn{10}{c}{Power output by the lithium titanate battery to the outside} |
|---|---|---|---|---|---|---|---|---|---|---|
| | 1st minute | 2nd minute | 3rd minute | 4th minute | 5th minute | 6th minute | 7th minute | 8th minute | 9th minute | 10th minute |
| Power (kW) | 114.3 | 119.6 | 115 | 0 | 0.9 | 0.9 | 0.9 | 186 | 0.9 | 0 |
| | 11th minute | 12th minute | 13th minute | 14th minute | 15th minute | 16th minute | 17th minute | 18th minute | 19th minute | 20th minute |
| Power (kW) | 0.9 | 186 | 220.8 | 220.8 | 187.2 | 0 | 0.9 | 0 | 0 | 189.2 |
| | 21th minute | 22th minute | 23th minute | 24th minute | 25th minute | 26th minute | 27th minute | 28th minute | 29th minute | 30th minute |
| Power (kW) | 218.7 | 218.7 | 218.7 | 2.18.7 | 157.2 | 2.19 | 187 | 0 | 188 | 0.9 |
| | 31th minute | 32th minute | 33th minute | 34th minute | 35th minute | 36th minute | 37th minute | 38th minute | 39th minute | 40th minute |
| Power (kW) | 0 | 189.2 | 220.8 | 220.8 | 220.8 | 189 | 0 | 189. | 219 | 219 |

TABLE a4-continued

| | Power output by the lithium titanate battery to the outside | | | | | | | | |
|---|---|---|---|---|---|---|---|---|---|
| | 41th minute | 42th minute | 43th minute | 44th minute | 45th minute | 46th minute | 47th minute | 48th minute | 49th minute | 50th minute |
| Power (kW) | 220.8 | 220.8 | 186 | 0.9 | 186 | 0 | 0.9 | 0 | 0.9 | 0.9 |
| | 51th minute | 52th minute | 53th minute | 54th minute | 55th minute | 56th minute | 57th minute | 58th minute | 59th minute | 60th minute |
| Power (kW) | 0.9 | 0 | 189.2 | 0 | 187.2 | 189 | 0 | 0.9 | 0.9 | 0.9 |

Under the condition that the total capacity of the battery is the same, in the present invention, the performance of a pure lithium iron phosphate battery, the performance of a pure lithium titanate batter and the performance of combined operation of the two batteries at low temperature are compared, and the results are as shown in Table 1.

TABLE 1

Comparison among energy storage systems with a single battery type and an energy storage system with multiple batteries

| Serial number | Battery constitution | Total weight (kg) | Total cost (RMB) | Total output electric energy (kWh) |
|---|---|---|---|---|
| 1 | 370 kWh lithium iron phosphate battery | 2846 | 555000 | 69.92 |
| 2 | 370 kWh lithium titanate battery | 4933 | 1776000 | 187.96 |
| 3 | 122 kWh lithium iron phosphate battery, 248 kWh lithium titanate battery and heating device | 3544 | 960000 | 313.6 |

The results show that in the method of the present invention, under the condition that the total weight is smaller and the total cost is lower, the total electric energy output at low temperature is 448.5% of the total electric energy output by the pure lithium iron phosphate battery and is 166.8% of the electric energy output by the pure lithium titanate battery. In addition, in case 1, a cost of 7937.6 RMB and a load of 40.7 kg are required for outputting 1 kWh of electric energy at each time; in case 2, a cost of 9448.82 RMB and a load of 26.24 kg are required for outputting 1 kWh of electric energy at each time; and in case 3, a cost of 3115.4 RMB and a load of 11.4 kg are required for outputting 1 kWh of electric energy at each time. Therefore, the cost per kWh of electric energy output by the method of the present invention is only 37% of that of the pure lithium iron phosphate battery and 32.9% of that of the pure lithium titanate battery. The load required for outputting per kWh of electric energy by the method of the present invention is only 28% of that of the pure lithium iron phosphate battery and 43.4% of that of the pure lithium titanate battery. It can be seen from this that the present invention has significant advantages compared with the existing methods, and therefore has great significance.

In an environment at −30° C., a battery energy storage system composed of the 122 kWh lithium titanate battery, the 248 kWh lithium iron phosphate battery and the heating equipment is taken as a test object to test the effectiveness of the method provided in the present invention. The results show that the cost per kWh of electric energy output by the method provided in the present invention is only 37% of that of the pure lithium iron phosphate battery and 32.9% of that of the pure lithium titanate battery. The load required for outputting per kWh of electric energy by the method of the present invention is only 28% of that of the pure lithium iron phosphate battery and 43.4% of that of the pure lithium titanate battery.

It can be seen that the method provided in the present invention achieves the high-efficiency work of the battery energy storage system at low temperature.

A person skilled in the art can understand that the embodiments of the present invention may be provided as a method, a system, or a computer program product. Therefore, the present invention may use a form of hardware-only embodiments, software-only embodiments, or embodiments combining software and hardware. In addition, the present invention may use a form of a computer program product that is implemented on one or more computer-usable storage media (including but not limited to a disk memory, a CD-ROM, an optical memory, and the like) that include computer-usable program code.

The present invention is described with reference to flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

The foregoing descriptions are exemplary implementations of the present invention. A person of ordinary skill in the art may make some improvements and variations without departing from the technical principle of the present invention and the improvements and variations shall fall within the protection scope of the present invention.

What is claimed is:

1. A high-efficiency working method for a battery energy storage system at low temperature, wherein an energy storage system framework composed of various kinds of batteries is built; an energy storage system optimization model is built on the basis of advantage complementation of all the kinds of batteries; and the optimization model is solved using a solver to obtain an optimal dispatching solution for the battery energy storage system composed of the various kinds of batteries at low temperature;

wherein the energy storage system is composed of a lithium titanate battery, a lithium iron phosphate battery, and heating equipment; the lithium titanate battery is firstly used for charging the heating equipment to increase a temperature in an energy storage house; when the temperature reaches a certain range, the lithium iron phosphate battery then executes charging and discharging work; and the optimization model is built as shown below:

$$\max \sum p_{SUP}^{ES1}(t) + \sum p_{SUP}^{ES2}(t), \text{ S.t.} \begin{cases} \text{electric balance:}(a1)-(a10) \\ \text{heat balance:}(a11)-(a14) \end{cases}$$

wherein $p_{SUP}^{ES1}$ is power output by the lithium iron phosphate battery to the outside; $p_{SUP}^{ES2}$ is power output by the lithium titanate battery to the outside, a balance model of an electric system is as shown in (a1) to (a10) below:

$$p_{con}^{ES1}(t) \cdot \eta^{ES1}(T_t) = p_{all}^{ES1}(t) \tag{a1}$$

$$p_{all}^{ES1}(t) = p_{SUP}^{ES1}(t) + p_{AC}^{ES1}(t) \tag{a2}$$

$$p_{con}^{ES2}(t) \cdot \eta^{ES2}(T_t) = p_{all}^{ES2}(t) \tag{a3}$$

$$p_{all}^{ES2}(t) = p_{SUP}^{ES2}(t) + p_{AC}^{ES2}(t) \tag{a4}$$

in the formulas, $p_{con}^{ES1}$ is electric energy consumed inside the lithium iron phosphate battery; $\eta^{ES1}(T_t)$ is output efficiency of the lithium iron phosphate battery; $p_{all}^{ES1}(t)$ is total electric energy output by the lithium iron phosphate battery; $p_{AC}^{ES1}$ is power transmitted by the lithium iron phosphate battery to the heating equipment; $p_{con}^{ES2}$ is electric energy consumed inside the lithium titanate battery; $\eta^{ES2}(T_t)$ is output efficiency of the lithium titanate battery; $p_{all}^{ES2}(t)$ is total electric energy output by the lithium titanate battery; $p_{AC}^{ES2}$ is power transmitted by the lithium titanate battery to the heating equipment;

efficiency of battery packs in formulas (a1) and (a2) is affected by temperature, as shown in formulas (a5)-(a6):

$$\eta^{ES1}(T_t^{in}) = k_1^{\eta} \cdot T^{in}(t) + C_1^{\eta} \tag{a5}$$

$$\eta^{ES2}(T_t^{in}) = k_2^{\eta} \cdot T^{in}(t) + C_2^{\eta} \tag{a6}$$

wherein $T^{in}$ is temperature in the energy storage house, and $k_1^{\eta}$, $k_2^{\eta}$, $C_1^{\eta}$, $C_2^{\eta}$ are fit coefficients; in addition, total electric energy consumed by the two groups of batteries should not exceed maximum electric energies $ES_{max}^{ES1}$ and $ES_{max}^{ES2}$ stored in the batteries; power output by the two groups of batteries should not exceed maximum power $ESP_{max}^{ES1}$ and $ESP_{max}^{ES2}$ of the batteries; that is:

$$\Sigma p_{con}^{ES1} \leq ES_{max}^{ES1} \tag{a7}$$

$$\Sigma p_{con}^{ES2} \leq ES_{max}^{ES2} \tag{a8}$$

$$p_{con}^{ES1} \leq ESP_{max}^{ES1} \tag{a9}$$

$$p_{con}^{ES2} \leq ESP_{max}^{ES2} \tag{a10}$$

a heat balance model is as shown in (a11) to (a14) below:

$$C \cdot (T^{in}(t+1) - T^{in}(t)) = \left( \frac{T^{out} - T^{in}(t)}{R} + Q^{ES1}(t) + Q^{ES2}(t) + Q^{AC}(t) \right) \tag{a11}$$

formula (a11) represents that a sum of heat added in the house is equal to multiplying a thermal capacitance C with a variation of the temperature in the house; $Q^{ES1}$ represents heat emitted by the lithium iron phosphate battery; $Q^{ES2}$ represents heat emitted by the lithium titanate battery; $Q^{AC}$ represents heat emitted by a heating equipment; $T^{out}$ is a temperature outside the house; $T^{in}$ is the temperature inside the house; R is a thermal resistance;

heat output by the two batteries and the temperature in the house are linearly correlated; a relationship between the heat output by the battery and the temperature is as follows:

$$Q^{ES1}(t) = k_1^Q \cdot T^{in}(t) + C_1^Q \tag{a12}$$

$$Q^{ES2}(t) = k_2^Q \cdot T^{in}(t) + C_2^Q \tag{a13}$$

the heat $Q^{AC}$ emitted by the heating equipment is in direct proportion to a product of voltage and current of the heating equipment, that is, is in direct proportion to electric energy consumed by the heating equipment $L^{AC}$ $$Q^{AC}(t) = k_3^Q L^{AC}(t) \tag{a14}$$

in the formulas, $k_1^Q$, $k_2^Q$, $k_3^Q$, $C_1^Q$, $C_2^Q$ are fit coefficients.

2. The high-efficiency working method for a battery energy storage system at low temperature according to claim 1, wherein the battery adopts a pulse discharging method.

3. The high-efficiency working method for a battery energy storage system at low temperature according to claim 1, wherein when a discharging process is going to end, supplying of power to the heating equipment is stopped.

4. The high-efficiency working method for a battery energy storage system at low temperature according to claim 1, wherein in a discharging process, by adjusting the power consumed by the heating equipment and the output power of the batteries, in case of considering heating power consumption, a temperature in an energy storage house is controlled in a degree that is suitable for the work of the batteries, so that the output efficiency of the batteries is the highest.

* * * * *